United States Patent [19]

Kehl et al.

[11] 4,426,114

[45] Jan. 17, 1984

[54] UNITARY SUPPORTING AND SEAT FRAME FOR RIGID SEAT

[75] Inventors: Norman J. Kehl, Elk Grove Village; Richard C. Magnuson, Island Lake, both of Ill.

[73] Assignee: Coach and Car Equipment Corporation, Elk Grove Village, Ill.

[21] Appl. No.: 252,057

[22] Filed: Apr. 8, 1981

[51] Int. Cl.³ .................... A47C 1/12; A47C 7/02
[52] U.S. Cl. .................... 297/232; 297/445; 297/450; 297/452
[58] Field of Search ............... 297/457, 450, 452, 232, 297/445, 454, 458, 460, 443

[56] References Cited

U.S. PATENT DOCUMENTS

| | | | |
|---|---|---|---|
| 813,460 | 2/1906 | Smith et al. | 297/232 X |
| 1,842,054 | 1/1932 | Sobel | 297/232 |
| 2,588,417 | 3/1952 | Schlandermundt et al. | 297/457 X |
| 3,027,190 | 3/1962 | Schaefer et al. | 297/232 |
| 3,072,434 | 1/1963 | Schaefer | 297/457 X |
| 3,564,700 | 2/1971 | Binek | 297/452 X |
| 3,619,004 | 11/1971 | McKernan et al. | 297/248 |
| 3,625,565 | 12/1971 | Barecki | 297/350 |
| 3,737,198 | 6/1973 | Barecki et al. | 297/450 |
| 3,797,887 | 3/1974 | Barecki | 297/450 |
| 3,870,366 | 3/1975 | Rogers | 297/450 |
| 3,874,729 | 4/1975 | Blodee | 297/445 |
| 3,899,211 | 8/1975 | Barecki | 297/451 |
| 3,944,283 | 3/1976 | Molzon | 297/450 |
| 3,951,454 | 4/1976 | Tantlinger | 297/452 |
| 4,060,279 | 11/1977 | Vogel | 297/445 |
| 4,109,959 | 8/1978 | Barecki et al. | 297/445 |
| 4,118,061 | 10/1978 | Atkinson et al. | 297/450 |
| 4,152,023 | 5/1979 | Buhk | 297/445 X |
| 4,252,372 | 2/1981 | Harder, Jr. | 297/452 |
| 4,275,925 | 6/1981 | Harder, Jr. | 297/452 X |
| 4,318,556 | 3/1982 | Rowland | 297/452 X |

*Primary Examiner*—James T. McCall
*Attorney, Agent, or Firm*—Merriam, Marshall & Bicknell

[57] ABSTRACT

A longitudinal seat assembly for three or more occupants and comprising a plurality of seats mounted on a unitary supporting and seat frame. The unitary frame has horizontally and vertically disposed portions, and the vertically disposed portion terminates substantially below the seat tops.

14 Claims, 8 Drawing Figures

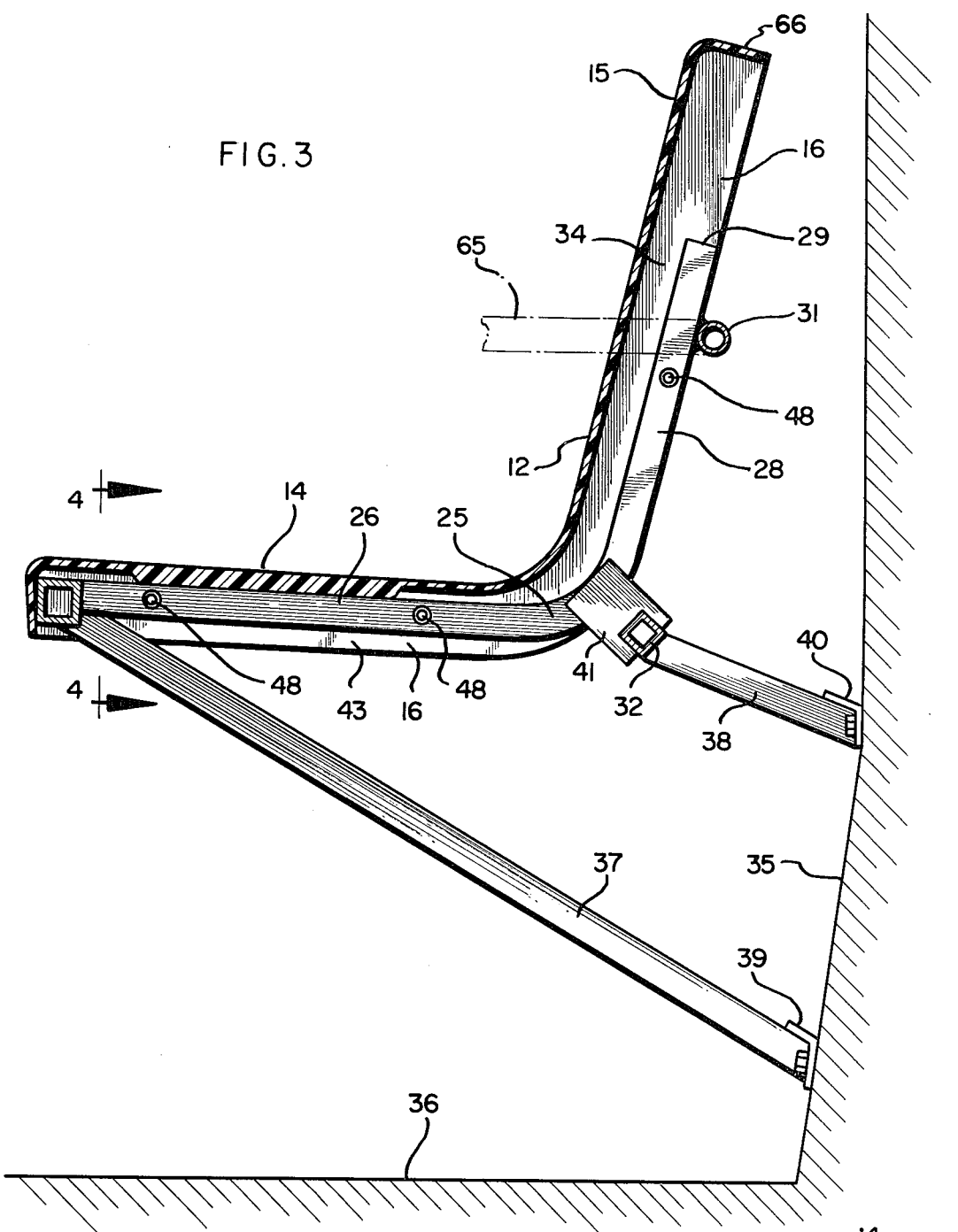
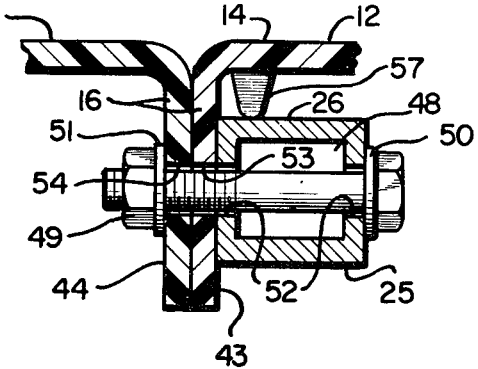

UNITARY SUPPORTING AND SEAT FRAME FOR RIGID SEAT

BACKGROUND OF THE INVENTION

The present invention relates generally to seats for mass transit vehicles such as buses or subway cars, and, more particularly, to multi-passenger, longitudinal, vehicle seat assemblies.

A longitudinal seat extends along the side walls of a bus or subway car, or along the back wall of a bus, and normally seats three or more occupants. This is to be distinguished from a transverse seat which extends between the wall and aisle of a bus or rapid transit car and normally seats only two occupants. Because of vandalism problems and for other reasons, it is desirable to construct the seat in a mass transit vehicle out of a rigid material such as fiberglass-reinforced plastic or the like. Conventionally, each rigid seat is mounted on a seat frame and the combined rigid seat and frame are in turn mounted on a supporting frame which may either be cantilevered from the wall of the vehicle or rest on the floor of the vehicle.

An example of a conventional longitudinal vehicle seat assembly employing a rigid seat, a seat frame and a separate supporting frame is disclosed in Barecki, U.S. Pat. No. 3,625,565. In such a conventional seat assembly, the frame members on the seat frame are substantially coextensive with the rigid seat, in both horizontal and vertical directions.

As noted above, such a seat assembly usually supports three or more occupants, and it is often necessary to construct the rigid seat in two or more sections, particularly where the number of occupants is greater than three. In such a case, because each of the plurality of discrete seat sections is supported by its own seat frame, problems arise in aligning the individual seat frames with each other, on the supporting frame. An example of a seating arrangement of the type described in the preceding part of this paragraph is disclosed in McKernan, et al., U.S. Pat. No. 3,619,004.

In order to avoid the alignment problems arising when there is a plurality of seat frames, when the seat assembly seats three occupants the seat has been formed in one monolithic, 3-seat section, which is undesirable. Smaller seat sections, accommodating no more than one or two occupants are more desirable.

SUMMARY OF THE INVENTION

A multi-passenger, longitudinal, vehicle seat assembly in accordance with the present invention employs rigid seats together with a single, unitary supporting and seat frame for all of the seats.

More particularly, the assembly comprises a plurality of separate, discrete seats composed of rigid material, arranged in side-by-side relation, and comprising structure for seating at least three occupants. Each of the rigid seats has a substantially horizontally disposed seat portion integral with a substantially vertically disposed back portion, and there is a substantially continuous peripheral flange depending downwardly from the periphery of the seat portion and extending rearwardly from the periphery of the back portion. The peripheral flange comprises a flange portion on each side of the seat.

The single, unitary supporting and seat frame for all of the seats in the assembly comprises a pair of end members each having a substantially horizontal disposed portion terminating at a front end and a substantially vertically disposed portion terminating at a top end. There is a plurality of spaced-apart intermediate members located between the end members on the frame, and each of the intermediate members has a substantially horizontally disposed portion terminating at a front end and a substantially vertically disposed portion terminating at a top end. The unitary frame also includes a horizontally disposed front frame member attached to the front end of the end members and intermediate members; and the unitary frame further includes a horizontally disposed upper frame member attached to the substantially vertically disposed portion of the end members and the intermediate members below the top ends of each and above the substantially horizontally disposed portion of each. The unitary frame mounts the plurality of rigid seats directly thereon, and the unitary frame is attached along a wall of the vehicle with the front and upper frame members disposed substantially parallel to the wall.

The horizontally disposed upper frame member on the unitary frame is located at about arm-rest height. Each substantially vertically disposed portion of a rigid seat has a seat top, and the top ends of the vertically disposed portions of the end members and intermediate members are located substantially below the seat tops. Each of these vertically disposed portions of the end members and intermediate members comprises an extension located above the horizontally disposed upper frame member which, as previously noted, is located at about arm-rest height.

This upper frame member, the extensions on the end and intermediate members and those parts of the seat's peripheral flange which are coextensive with and above the extensions cooperate to impart to the seat sufficient structural integrity to withstand normal operating forces against any part of the back portion of the seat, and this is so despite the fact that all of the vertically disposed frame members terminate substantially below the top of the seats.

The problems described above in connection with conventional seat assemblies are eliminated in a seat assembly constructed in accordance with the present invention. There is only a single unitary frame, providing both supporting and seat mounting functions, for all the seats. Accordingly, there is no problem in trying to align a plurality of seat frames on a single supporting frame, and a smaller seat section accommodating no more than one or two occupants may be used. Furthermore, it is not necessary to provide a frame which is vertically coextensive with the seats.

Because the problems of aligning individual seats mounted on individual seat frames are eliminated, a structure in accordance with the present invention lends itself readily to the mounting of two or more seat sections on a frame intended to support three or more occupants. The smaller the seat occupant capacity for a given seat section, the less the load exerted against the top part of the seat. Accordingly, there is less likelihood of damage or breakage to a seat top when there are a plurality of seat sections mounted on the frame rather than a single seat section seating the same number of occupants. As a result, there is a reduction in the strength requirements of that part of the frame supporting the top of a seat section.

When two or more seat sections are mounted on a unitary supporting frame, they are attached to the frame and to each other in the following manner. The peripheral flange portion on an inner side of one seat section is attached directly to an intermediate member of the seat frame, and the peripheral flange portion on an inner side of the adjacent seat section is attached directly to the peripheral flange portion on the inner side of the one seat section. Thus, only one of two adjoining seats has its inner side attached to a frame member, and the same fastening means (e.g., a single nut and bolt) may be used for affecting both attachments.

In addition to the advantages described above, structure for mounting the various seat sections on the horizontally disposed frame members of the unitary supporting and seat frame are reduced and simplified.

Other features and advantages are inherent in the structure claimed and disclosed or will become apparent to those skilled in the art from the following detailed description in conjunction with the accompanying diagrammatic drawings.

BRIEF DESCRIPTION OF THE DRAWINGS

FIG. 3 is a sectional view taken along line 3—3 in FIG. 2;

FIG. 4 is a sectional view taken along line 4—4 in FIG. 3;

FIG. 8 is a fragmentary sectional view taken along line 8—8 in FIG. 5.

DETAILED DESCRIPTION

Figure 1:
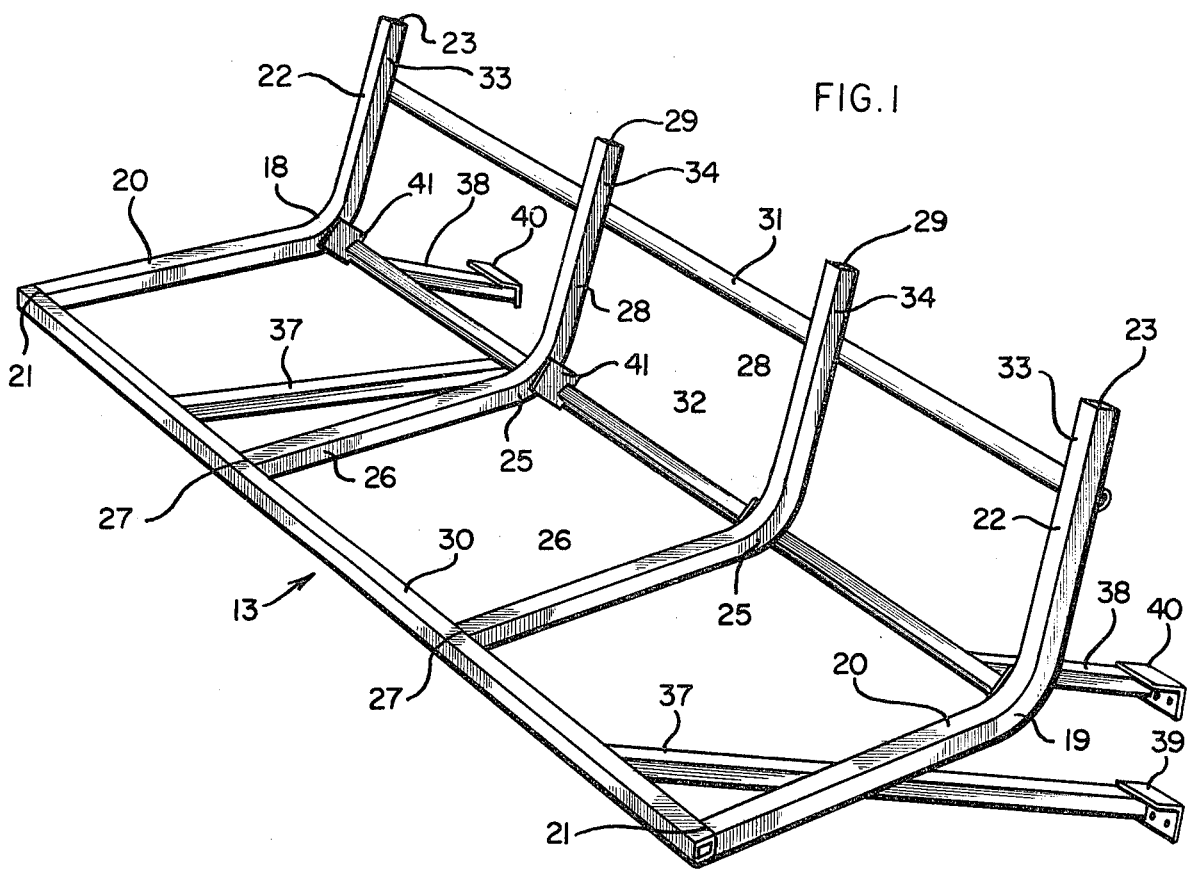
FIG. 1 is a perspective of a unitary seat and supporting frame for a multi-passenger, longitudinal, vehicle seat assembly constructed in accordance with one embodiment of the present invention.
Figure 2:
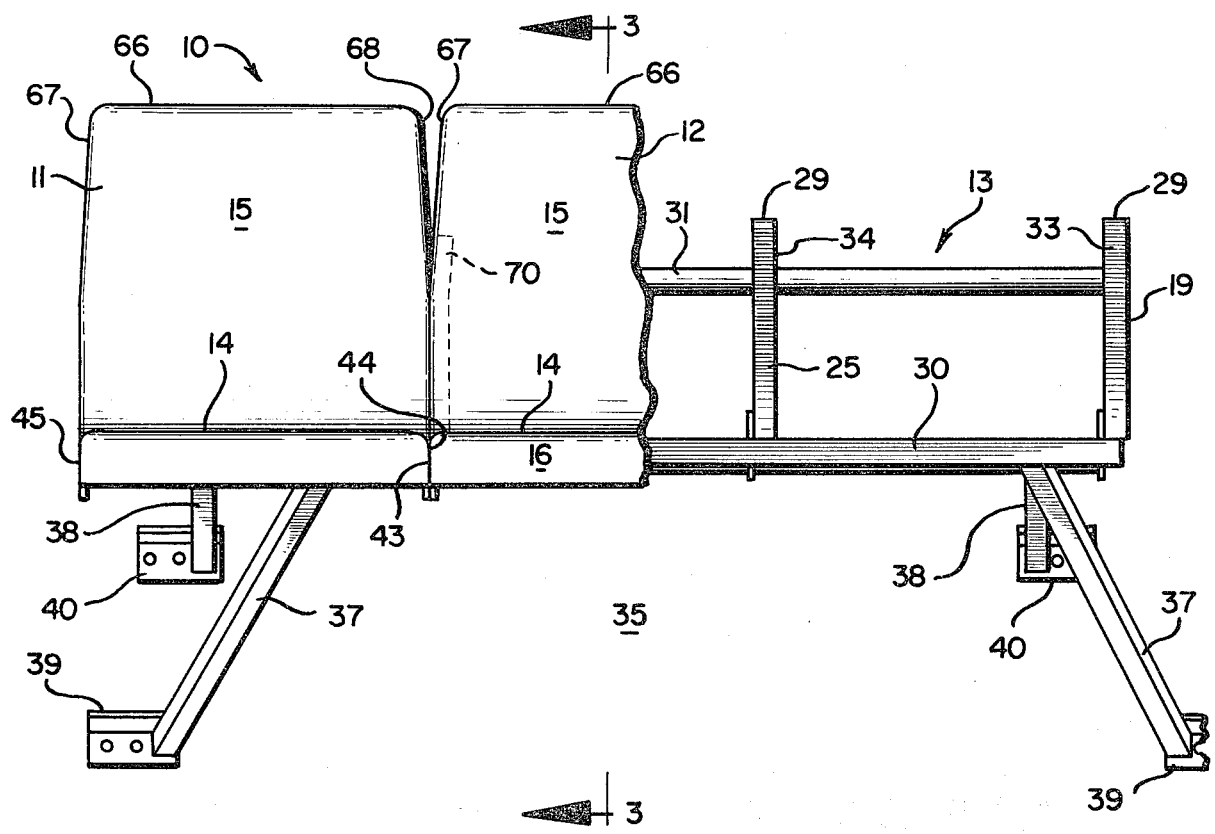
FIG. 2 is a front view, partially cut away of the seat assembly, the unitary frame of which is illustrated in FIG. 1.
Figure 5:
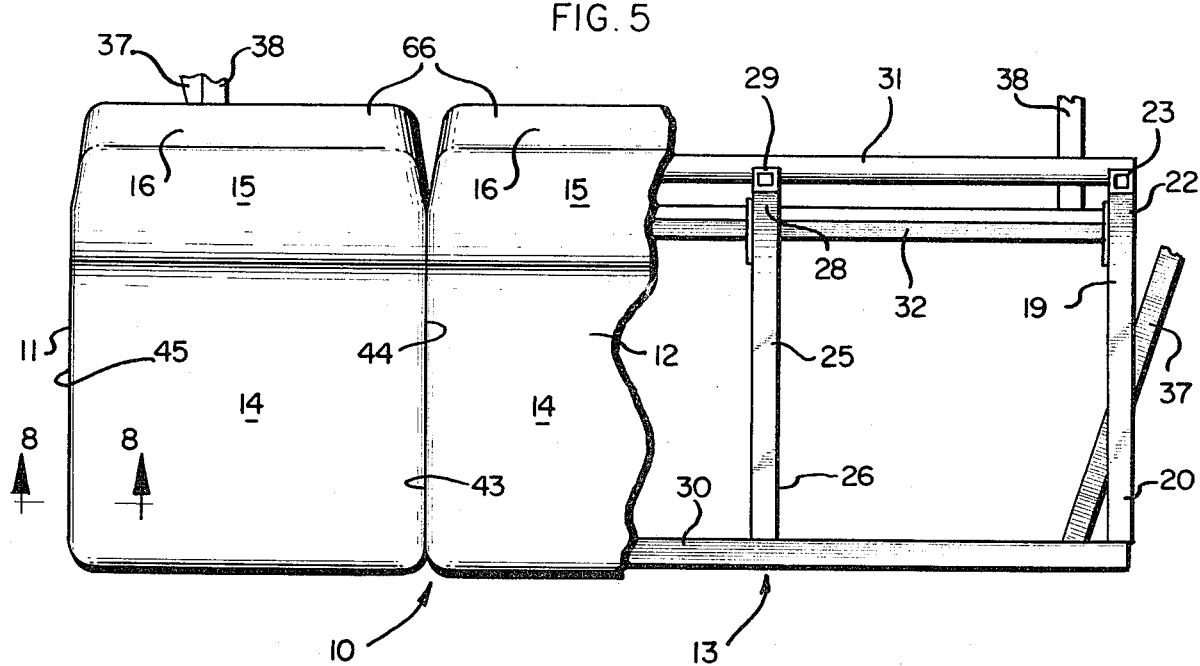
FIG. 5 is a plan view of the seat assembly illustrated in FIG. 2.

Referring initially to FIGS. 2 and 5, indicated generally at 10 is a multi-passenger, longitudinal, vehicle seat assembly constructed in accordance with an embodiment of the present invention. Seat assembly 10 comprises a plurality of outer seats, only one of which is shown at 11, and an inner seat 12, all of which are mounted on a unitary seat and supporting frame indicated generally at 13 and shown most fully in FIG. 1.

The plurality of separate, discrete seats 11,12 are composed of a rigid material such as fiber glass reinforced plastic (e.g., a polyester resin) and are arranged in side-by-side relation on frame 13. Seats 11,12 can accommodate at least three occupants in the embodiment illustrated in FIGS. 2 and 5. The rigid seats 11,12 may also be composed of a rigid plastic, such as molded polycarbonate, or may be formed from sheet metal, such as stainless steel or aluminum.

Referring to FIGS. 2-3 and 5-7, each rigid seat has a substantially horizontally disposed seat portion 14 integral with a substantially vertically disposed back portion 15. On each seat 11,12, there is a substantially continuous peripheral flange 16 depending downwardly from the periphery of seat portion 14 and extending rearwardly from the periphery of back portion 15. Peripheral flange 16 provides a flange portion on each side of each seat.

Referring now particularly to FIG. 1, unitary frame 13 comprises a pair of end members, 18,19, each having a substantially horizontally disposed portion 20 terminating at a front end 21 and a substantially vertically disposed portion 22 terminating at a top end 23.

Located between end members 18,19 are a plurality of spaced-apart intermediate members 25,25. Each intermediate member 25 includes a substantially horizontally disposed portion 26 terminating at a front end 27 and a substantially vertically disposed portion 28 terminating at a top end 29. Intermediate members 25,25 are spaced apart a distance corresponding to the dimension in a longitudinal direction of the seating means for one seat occupant.

Also included in frame 13 is a horizontally disposed front frame member 30 attached to the front ends 21,27 of the end members and intermediate members, respectively. A horizontally disposed upper frame member 31 is attached to the substantially vertically disposed portions 22,28 of the end members and intermediate members respectively, below the top ends 23,29 of each and above the substantially horizontally disposed portions 20,26 of each. A horizontally disposed rear frame member 32 is attached to end members 18,19 and intermediate members 25,25 by plates 41 adjacent the bottom of the substantially vertically disposed portions 22,28 of each. Upper frame member 31 is closer to top ends 23,29 than to the horizontally disposed portions 20,26 of the respective end members and intermediate members. As shown in the drawings, there is no horizontally disposed frame member above upper frame member 31 or between upper frame member 31 and rear frame member 32.

Figure 6:
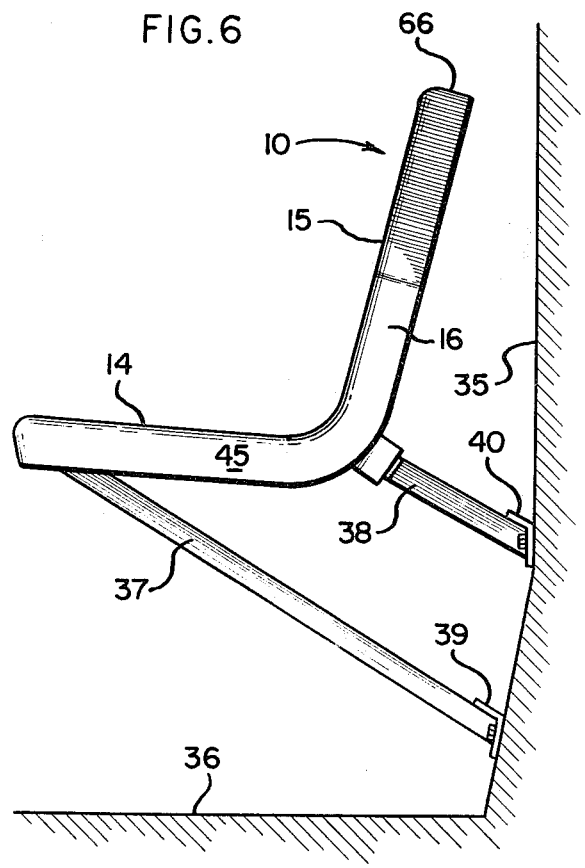
FIG. 6 is a side elevational view of the seat assembly illustrated in FIGS. 2 and 5.

Referring to FIGS. 3 and 6, in the illustrated embodiment, seat assembly 10 is mounted in cantilevered relation to the side wall 35 of a mass transit vehicle such as a bus having a floor 36. This is accomplished by attaching or mounting frame 13 alongside wall 35 with front member 30, upper member 31 and rear member 32 disposed substantially parallel to wall 35. More particularly, extending between the frame's front member 30 and side wall 35 are a pair of lower truss members 37,37 terminating at brackets 39,39 attached to wall 35. Similarly, extending between the frame's rear member 32 and side wall 35 are a pair of lower truss members 38,38 terminating at brackets 40,40 attached to wall 35.

Unitary frame 13, together with truss members 37,37 and sidewall 35 form a box truss, with wall 35 completing the box and imparting increased rigidity to the frame. Alternatively, unitary frame 13 could be mounted alongside wall 35 on pedestals.

Inner seat 12 and outer seats 11,11 are mounted directly on unitary frame 13, using an arrangement now to be described.

Referring to FIGS. 2-8, each inner seat 12 has a pair of sides 43,43, and each outer seat 12 has an inside 44 and an outside 45. As previously noted, peripheral flange 16 comprises flange portions on each side of each seat. The peripheral flange portion on one side 43 of inner seat 12 is attached directly to one intermediate member 25, and the peripheral flange portion on the other side 43 of inner seat 12 is attached directly to the other intermediate member 25. The peripheral flange portion at the inside 44 of each outer seat 11 is attached directly to the peripheral flange portion on a respective side 43 of inner seat 12 (FIG. 4). The peripheral flange portion at the outside 45 of each outer seat 11 is attached directly to a respective end member 18,19 (see FIG. 8).

The peripheral flange portion on each side 43,43 of inner seat 12 is attached to a respective intermediate member 25,25 at both the horizontally and vertically disposed portions 26,28 of member 25. Similarly, the peripheral flange portion on the outside 45 of each outer seat 11,11 is attached to both the horizontally and vertically disposed portions 20,22 of a respective end member 18,19. Also, the peripheral flange portion on the inside 44 of each outer seat 11 is attached to the peripheral flange portion on a side 43 of inner seat 12 at both the horizontally disposed seat portions 14,14 and vertically disposed back portions 15,15 of seats 11,12.

The arrangement for directly attaching the peripheral flange portion at the inside 43 of inner seat 12 to intermediate member 25 and for directly attaching the peripheral flange portion at the inside 44 of outer seat 11 to the peripheral flange portion at the inside 43 of inner seat 12 is illustrated in detail in FIG. 4.

In this arrangement, intermediate member 25 has a plurality of aligned openings 52,52. Aligned with openings 52,52 is an opening 53 in the peripheral flange portion at the inside 43 of inner seat 12. Also aligned with openings 52,53 is an opening 54 in the peripheral flange portion at the inside 44 of outer seat 11. Extending through aligned openings 52,53,54 is a bolt 48 secured in place by a nut 49. Located between the head of bolt 48 and intermediate member 25 is a washer 50, and located between nut 49 and the inside 44 of outer seat 11 is a washer 51. Thus, a single fastener arrangement comprising bolt 48, nut 49 and washers 50,51 directly attaches the peripheral flange portion on one side 43 of inner seat 12 to intermediate member 25 and also directly attaches the peripheral flange portion 16 at the inside 44 of outer seat 11 to the peripheral flange portion on a side 43 of inner seat 12.

A similar nut and bolt arrangement may be used to attach the peripheral flange portion at the outside 45 of each outer seat 13 to a respective end member 18,19.

The horizontally disposed seat portion 14 of each seat may be provided with a depending rib 57 adjacent the peripheral flange portion thereof (FIG. 4), for resting on either the horizontally disposed portion 26 of an intermediate member 25, in the case of inner seat 12, or on the horizontally disposed portion 20 of a respective end member 18,19 in the case of an outer seat 11. Depending rib 57 spaces the horizontally disposed seat portion 14 slightly above an underlying frame member 18,19 or 25. In lieu of depending rib 57, a spacer element 58 may be used (FIG. 8).

Only the seat which is directly attached to a frame member (whether an intermediate frame member 25 or an end member 18,19) is provided with a spacer such as depending rib 57 in FIG. 4 or spacer elements 58 in FIG. 8. A spacer is not necessary at that side of the seat which is not directly attached to a frame member. In other words, with regard to inner seat 12, because both sides 43,43 are directly attached to a frame member 25,25, each side would either include a depending rib 57 or be associated with a separator element 58. On the other hand, with respect to outer seats 11,11, because only the outer side 45 of each is directly attached to an end member, 18 or 19, only that part of the outer seat 11 adjacent its outer side 45 would include a depending rib 57 or be associated with a separator element 58. There would be no such provision at inner side 44 of outer seat 11.

Once an intermediate member 25 has been provided for an inner seat 12, no intermediate member need be provided for an outer seat 11 at the latter's inner side 44 adjacent the inner seat. Therefore, in addition to the end frame members 18,19, a frame 13 in accordance with the present invention need only include one intermediate frame member 25 at the junction of each two seats. This minimization of intermediate members is possible because the outer and inner seats 11,12 are joined together in the manner illustrated in FIG. 4. As shown in the drawings, the attachments described above fix the inner seat and the outer seats on the unitary frame and fix these seats relative to all the frame members.

Figure 7:
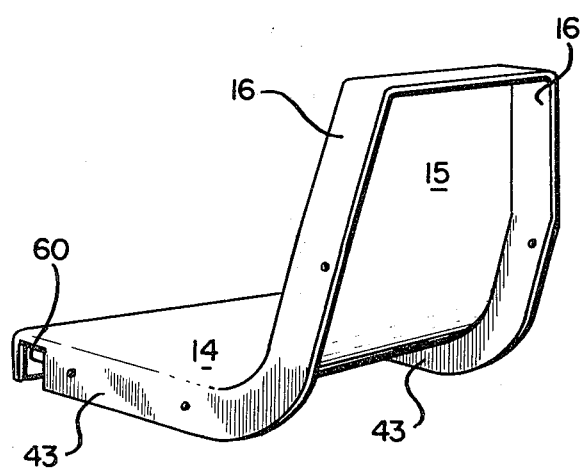
FIG. 7 is a perspective of a seat section for use in the assembly illustrated in FIGS. 2 and 5.

Referring to FIG. 7, at the horizontally disposed seat portion 14 of inner seat 12, there is a notch 60 in the peripheral flange portion on each side 43 of inner seat 12 to accommodate front frame member 30. There is also a notch (not shown), similar to notch 60, in the peripheral flange portion 16 at the inside 44 of each outer seat 13, to accommodate front frame member 30.

Referring to FIG. 3, a fragment of an armrest 65 is illustrated in dash-dot lines. Armrest 65 is attached to upper frame member 31 which is located at armrest height. Each substantially vertically disposed portion 15 of a rigid seat has a seat top 66 (FIGS. 2 and 3). The top ends 23,29 of the vertically disposed portions of the end members and intermediate members are located substantially below the seat tops 66,66. Each of the vertically disposed portions 22,28 of the end members and intermediate members, respectively, comprises an extension 33,34 located above horizontally disposed upper frame member 31.

During normal operation, forces are exerted against the back portion 15 of each of the seats 11,12. A seat assembly must have sufficient structural integrity to withstand these normal operating forces. Therefore, a seat assembly 10 in accordance with the present invention comprises structure including upper frame member 31, the vertically extensions 33,34 of the end members and intermediate member and those parts of a seat's peripheral flange 16 coextensive with and above extensions 33,34. This structure imparts to the seat, when mounted on frame 13, sufficient structural integrity to withstand the above-described normal operating forces. This is so even though the top ends 23,29 of the end members and intermediate members, respectively, are located substantially below seat tops 66,66.

Extensions 33,34 reinforce that part of the vertically disposed back portion 15 which is above upper frame member 31. In addition, that part of a seat's peripheral flange 16 which is above the frame's top ends 23,29 provides structural integrity to that part of the seat's back portion which is above top ends 23,29. Extensions 33,34 are of sufficient length that, together with the aforementioned part of peripheral flange 16, there is imparted, to the seat back portion above top ends 23,29, sufficient structural integrity to withstand the normal operating forces exerted thereagainst. In a typical embodiment in which a seat top 66 is located about eight inches above upper frame member 31, extensions 33,34 may have a length of about 2-3 inches.

Also contributing to the ability of a seat back portion 15 to withstand all normal operating forces exerted against it is the fact that each seat 11,12 is of a relatively small size, accommodating only one occupant. As a result, the force exerted against a seat back portion 15 doesn't exceed the force generated by the weight of one occupant. As previously noted, a seat assembly employing single or double-occupant seats in an assembly seating three or more persons is facilitated by the present invention which eliminates the problem of seat frame alignment, a problem accompanying assemblies in which the seat frame is separate and discrete from the supporting frame on which the seats are mounted.

Referring now to FIG. 2, the embodiment illustrated therein has a seat back portion 15 with a pair of sides 67,68 converging from a location below the frame's top ends 23,29 to seat top 26. In such a case, the frame extensions 33,34 are bent as shown at 70 in FIG. 2 to conform to the convergence of the seat sides. Although not shown in the figures, the bent extension 70 may be incorporated into all of the end members 18,19 and intermediate members 25,25.

The assembly illustrated in the drawings can accommodate three seat occupants. However, the present invention may also be utilized in seat assemblies accommodating more than three occupants. For example, in the case of a four-passenger seat assembly, there would be two seat sections each accommodating two occupants. These would be arranged in side-by-side relationship on a unitary seat and supporting frame having a pair of end members and three intermediate members. There would be one intermediate member at the location where the inner sides of the two seat sections are joined together, in a manner similar to that illustrated in FIG. 4, with the other two intermediate members each serving a supporting function for the center of each of the two seat sections. Similarly, in a seat assembly intended for five occupants, there would be two end seats each accommodating two occupants and a center seat accommodating one occupant. The locations where the center seat and outer seats are joined together would utilize an attaching arrangement similar to that illustrated in FIG. 4. In addition, there would be an intermediate member located below the center of each of the outer seat sections for supporting purposes only.

The foregoing detailed description has been given for clearness of understanding only, and no unnecessary limitations should be understood therefrom as modifications will be obvious to those skilled in the art.

I claim:

1. A multi-passenger, longitudinal, vehicle seat assembly comprising:
   a plurality of separate, discrete seats composed of rigid material, arranged in a side-by-side relation and comprising means for seating at least three occupants;
   each of said rigid seats comprising a substantially horizontally disposed seat portion integral with a substantially vertically disposed back portion having a seat top and a substantially continuous peripheral flange depending downwardly from the periphery of said seat portion and extending rearwardly from the periphery of said back portion;
   said peripheral flange comprising a flange portion on each side of said seat;
   a single, unitary supporting and seat frame for all of said seats;
   said frame comprising a pair of end members each having a substantially horizontally disposed portion terminating at a front end and a substantially vertically disposed portion terminating at a top end;
   a plurality of spaced-apart intermediate members located between said end members on said frame, each of said intermediate members having a substantially horizontally disposed portion terminating at a front end and a substantially vertically disposed portion terminating at a top end;
   a horizontally disposed front frame member attached to the front ends of said end members and intermediate members;
   a horizontally disposed upper frame member attached to the substantially vertically disposed portion of said end members and said intermediate members below the top ends of each and above said substantially horizontally disposed portion of each;
   a horizontally disposed rear frame member attached to said end members and said intermediate members adjacent the bottom of the substantially vertically disposed portion of each;
   said horizontally disposed upper frame member being located at about arm-rest height and substantially below said seat tops;
   there being no horizontally disposed frame member above said upper frame member or between said upper frame member and said rear frame member;
   means for mounting said unitary frame alongside a wall with said front, rear and upper frame members disposed substantially parallel to said wall;
   and means for mounting said plurality of rigid seats directly on said unitary frame.

2. A seat assembly as recited in claim 1 wherein said plurality of rigid seats comprises:
   an inner seat;
   a pair of outer seats;
   and a pair of sides on said inner seat;
   each outer seat having an inside and an outside.

3. A seat assembly as recited in claim 2 wherein said mounting means for the rigid seats comprises:
   means attaching the peripheral flange portion on one side of said inner seat directly to one intermediate member and means attaching the peripheral flange portion on the other side of said inner seat directly to another intermediate member;
   means attaching the peripheral flange portion at the inside of one outer seat directly to said peripheral flange portion on said one side of the inner seat;
   and means attaching the peripheral flange portion at the inside of the other outer seat directly to the peripheral flange portion on said other side of the inner seat.

4. A seat assembly as recited in claim 3 wherein:
   said attaching means for the inner seat comprises means attaching the peripheral flange portion on each side of said inner seat to a respective intermediate member at both the horizontally and vertically disposed portion of said member;
   and said mounting means for the outer seats comprises means attaching the peripheral flange portion on the outside of each outer seat to both the horizontally and vertically disposed portions of a respective end member.

5. A seat assembly as recited in claim 3 wherein:
   said means attaching the peripheral flange portion on one side of the inner seat directly to one intermediate member comprises one fastener means;
   and said means attaching the peripheral flange portion at the inside of one outer seat to said peripheral flange portion on said one side of the inner seat comprises the same one fastener means.

6. A seat assembly as recited in claim 2 wherein said mounting means for the rigid seats comprises:

means on each outer seat adjacent the outside of each for resting on a respective end member;

and means adjacent each side of said inner seat for resting on a respective intermediate member;

7. A seat assembly as recited in claim 2 and comprising:

a notch in the peripheral flange portion at the inside of each outer seat, to accommodate said front frame member;

and a notch in the peripheral flange portion on each side of said inner seat, to accommodate said front frame member;

said inner seat and said outer seats being fixed relative to said front frame member.

8. A seat assembly as recited in claim 1 wherein:

each of said seats has a top located substantially above the top ends of said end and intermediate members;

and said assembly comprises means, including that part of a seat's peripheral flange located above the top ends of said end and intermediate members, for imparting to the seat, when mounted on said frame, sufficient structural integrity to withstand normal operating forces on that part of the seat's back portion located above said top ends of said members.

9. A seat assembly as recited in claim 8 wherein said means for imparting said structural integrity comprises:

an extension on the vertically disposed portion of each end member and intermediate member;

said extensions being located above said horizontally disposed upper frame member and terminating at said top ends;

said extensions providing reinforcement for that part of the seat's back portion located above said upper frame member;

said extensions being of sufficient length to contribute to said structural integrity.

10. A seat assembly as recited in claim 1 wherein each of said rigid seats has an inner side and a side opposite said inner side and said mounting means for said seats comprises:

means attaching the peripheral flange portion on said inner side of one seat directly to one intermediate member and means attaching the peripheral flange portion on said opposite side of said one seat directly to another of said members;

means attaching the peripheral flange portion on said inner side of another seat directly to said peripheral flange portion on said inner side of said one seat;

and means attaching the peripheral flange portion on said opposite side of said other seat to another of said members.

11. A seat assembly as recited in claim 10 wherein:

said means attaching the peripheral flange portion on said inner side of one seat directly to one intermediate member comprises one fastener means;

and said means attaching the peripheral flange portion on the inner side of another seat directly to said peripheral flange portion on said inner side of said one seat comprises the same one fastener means.

12. A seat assembly as recited in claim 1 wherein;

each substantially vertically disposed portion of a rigid seat has a seat top;

and the top ends of said vertically disposed portions of the end members and intermediate members are located substantially below said seat tops.

13. A seat assembly as recited in claim 12 wherein:

each of said vertically disposed portions of the end members and intermediate members comprises an extension located above said horizontally disposed upper frame member;

and said assembly comprises means, including said upper frame member, said extensions and those parts of a seat's peripheral flange coextensive with and above said extensions, for imparting to a seat, when mounted on said frame, sufficient structural integrity to withstand normal operating forces against any part of the back portion of the seat.

14. A seat assembly as recited in claim 1 wherein:

said intermediate members are spaced apart a distance corresponding to the dimension in a longitudinal direction of the seating means for one seat-occupant.

* * * * *